Dec. 22, 1970 TOMOHISA YOSHIMARU ET AL 3,550,092

MEMORY CIRCUIT

Filed April 11, 1967 5 Sheets-Sheet 1

United States Patent Office 3,550,092

Patented Dec. 22, 1970

3,550,092

MEMORY CIRCUIT

Tomohisa Yoshimaru and Hiroshi Komikawa, Kawasaki-shi, Japan, assignors to Tokyo Shibaura Denki Kabushiki Kaisha, Kanagawa-ken, Japan, a joint-stock company of Japan Filed Apr. 11, 1967, Ser. No. 629,945

Claims priority, application Japan, May 4, 1966, 41/27,955; May 16, 1966, 41/30,632

Int. Cl. G11c *11/24*

U.S. Cl. 340—172.5 7 Claims

ABSTRACT OF THE DISCLOSURE

A memory element is constituted by a memory capacitor, write and read-out transistors connected to one terminal of the capacitor, and a flip-flop connected to the other terminal of the capacitor through a pair of diodes connected in parallel opposition. A plurality of such memory elements are arranged to form a matrix to provide a large capacity memory circuit, and a pair of memory circuits are interconnected by a logic element through flip-flops to form a memory and logic circuit.

This invention relates to a memory device and a memory and logic circuit utilizing a capacitor as a memory element.

Heretobefore various types of memory circuits have been proposed and are now being used in electronic computers, but they are not satisfactory in that they utilize expensive memory elements or require a large number of component elements and large space. As an inexpensive memory element, there has been proposed a high speed memory circuit utilizing two capacitors of different capacities as a pair, but this memory circuit is also disadvantageous in that its circuit construction is complicated and requires a large number of components and in that stability and accuracy are not satisfactory.

Further, most of the prior electronic computers are of the type comprising an independent memory circuit and a logic circuit each including a flip-flop. However, provision of independent flip-flops for the memory and logic circuits requires a larger number of component elements, thus increasing the physical size of the device.

It is a principal object of this invention to provide a novel memory device which eliminates the above mentioned defects.

Another object of this invention is to provide a simple and accurate memory circuit of matrix configuration.

A further object of this invention is to provide a memory and logic circuit of simple construction.

The basic conception of this invention is to utilize a capacitor as a memory element, the presence or absence of electric charge thereof corresponding to binary logic.

A preferred form of the basic memory device embodying this invention comprises a memory capacitor, the presence or absence of the electric charge thereof corresponding to binary logic, a PNP type write transistor, an NPN type read-out transistor, the collector electrodes of these transistors being connected to one terminal of the memory capacitor, a flip-flop and a pair of diodes connected in parallel opposition between the opposite terminal of the memory capacitor, and set and output terminals of the flip-flop. Write and read-out signals respectively applied to these transistors effect complete charge and discharge of the memory capacitor so that an information can be derived out when the capacitor is discharged. According to this invention a memory device of large capacity is fabricated by arranging a number of such memory elements in a matrix.

The memory and logic circuit embodying this invention comprises a pair of registers each including a matrix of memory capacitors similar to that described above, a pair of flip flops each associated with a separate one of the registers, and a logic element interconnecting said flip-flops.

The memory device and the memory and logic circuit of this invention require a smaller number of component elements than conventional circuits, so that it is possible to fabricate them to have smaller size and lighter weight. Moreover, the accuracy and stability of the circuits are greatly increased.

The novel features which characterize our invention are set forth with particularity in the appended claims. The invention itself, however, both as to its organization and method of operation together with further objects and advantages thereof may best be understood by reference to the following description taken in connection with the accompanying drawing in which:

Figure 7:
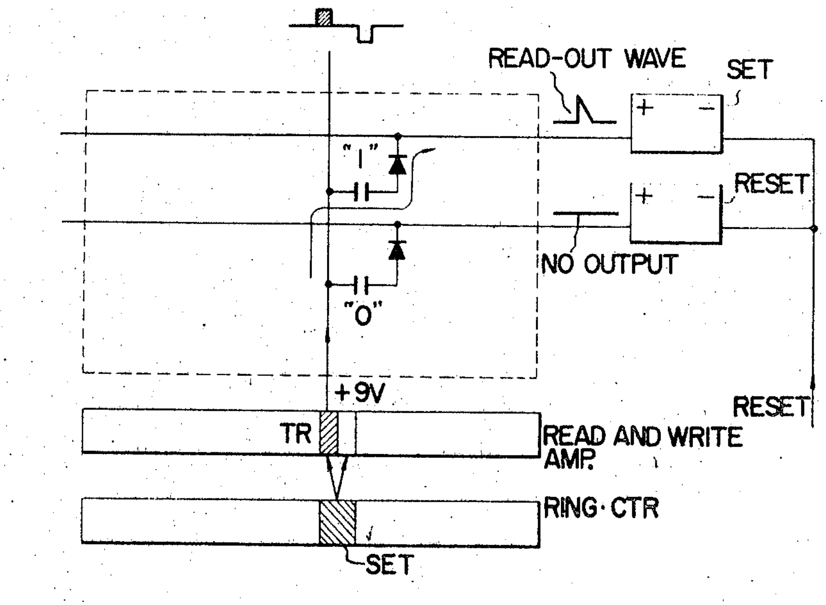
Figure 8:
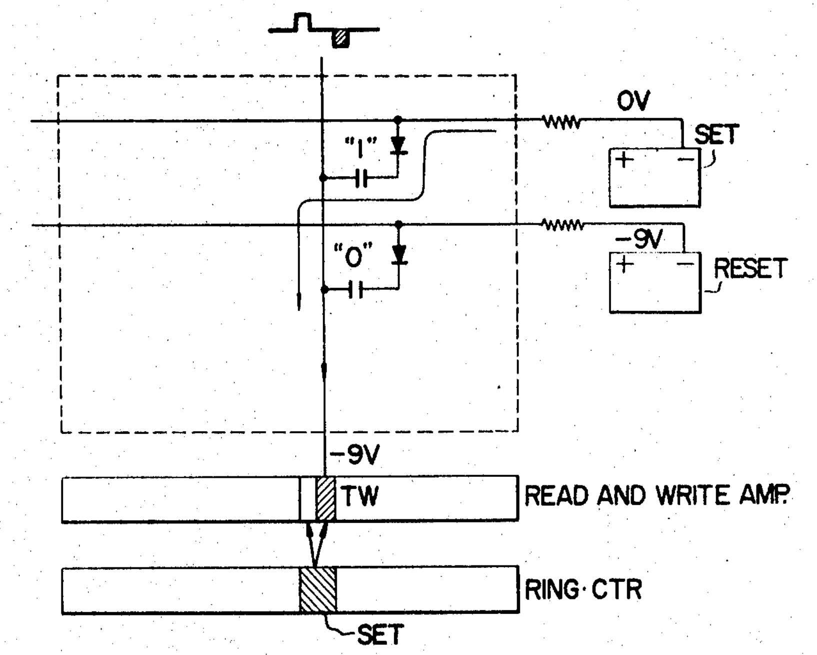

FIGS. 7 and 8 explain read-out and write operations, respectively; and

Figure 9:
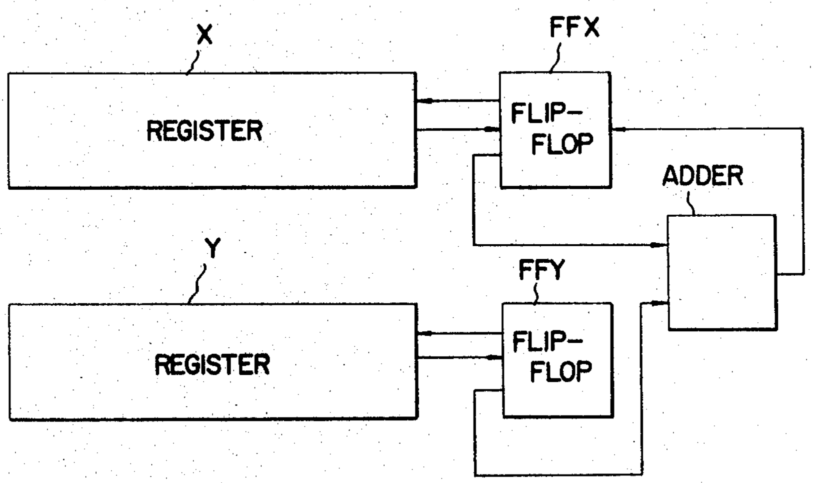

FIG. 9 shows a block diagram of a logic circuit utilizing the memory of this invention.

Figures 1, 4:
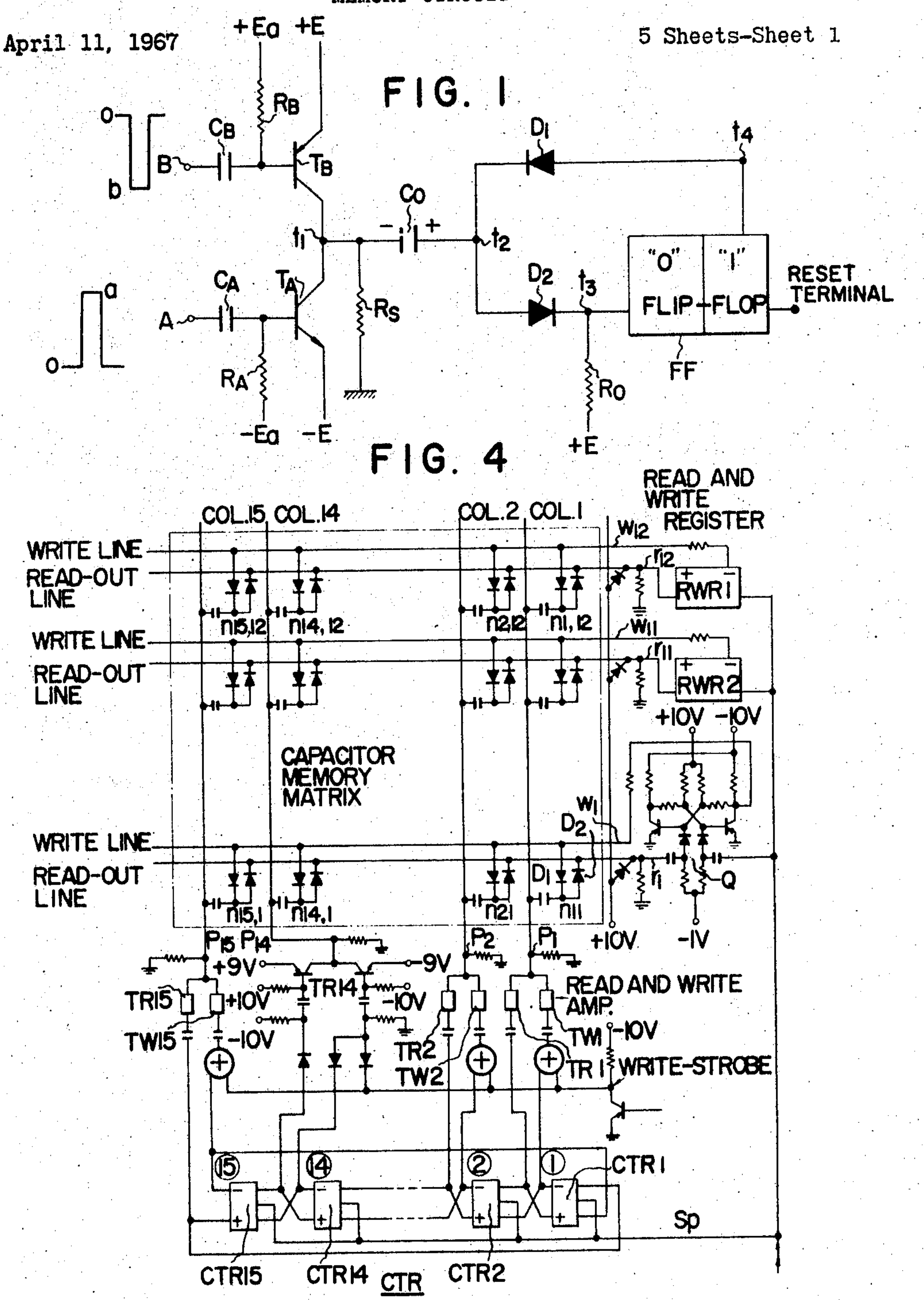
FIG. 1 shows a connection diagram of the basic circuit of a memory device of this invention.
FIG. 4 shows in more detail the circuit shown in FIG. 3.

Referring now to FIG. 1 of the accompanying drawing which illustrates a basic memory circuit of this invention there is shown a capacitor Co serving as a memory element, one terminal of the capacitor being connected to a junction $t_1$ between the collector electrodes of an NPN transistor $T_A$ and a PNP transistor $T_B$.

A voltage of $-E$ is applied to the emitter electrode of the transistor $T_A$, and a voltage of $-Ea$ is applied to the base electrode thereof via a resistor $R_A$, said base electrode being also connected to a write pulse input terminal A via a coupling capacitor $C_A$. A voltage of $+E$ is applied to the emitter electrode of the other transistor $T_B$, whereas a voltage of $+E_a$ is impressed upon the base electrode thereof via a resistor $R_B$. This base electrode is also connected to a read-out impulse input terminal B through a coupling capacitor $C_B$.

The other terminal of the memory capacitor $C_o$ is connected to the output terminal $t_4$ of a flip-flop FF through a diode $D_1$ and to the set terminal $t_3$ of said flip-flop through a second diode $D_2$ of opposite pole with respect to the first diode $D_1$, the terminal $t_3$ being also connected to a $+E$ source via a resistor $R_o$.

The operation of the basic circuit shown in FIG. 1 is as follows. If a positive pulse *a* as shown in FIG. 1 is impressed upon the write pulse input terminal A when the flip-flop is maintained in its set state, or the output terminal $t_4$ is at a binary "0" potential, the transistor $T_A$ will become conductive, a current will flow from the output terminal $t_4$ through first diode $D_1$, capacitor $C_o$, and transistor $T_A$ to charge the capacitor $C_o$ to a voltage substantially equal to voltage E. This voltage will be maintained for a long time after extinguishment of the pulse *a* and reset of the flip-flop FF. Resetting of the flip-flop FF, or provision of a binary "1" potential at terminal $t_4$ is performed by applying a suitable reset pulse to a reset terminal provided for the flip-flop, subsequent to writing. (However, the charge of the capacitor $C_o$ will discharge through its leakage resistance after a very long time.)

Figure 2:
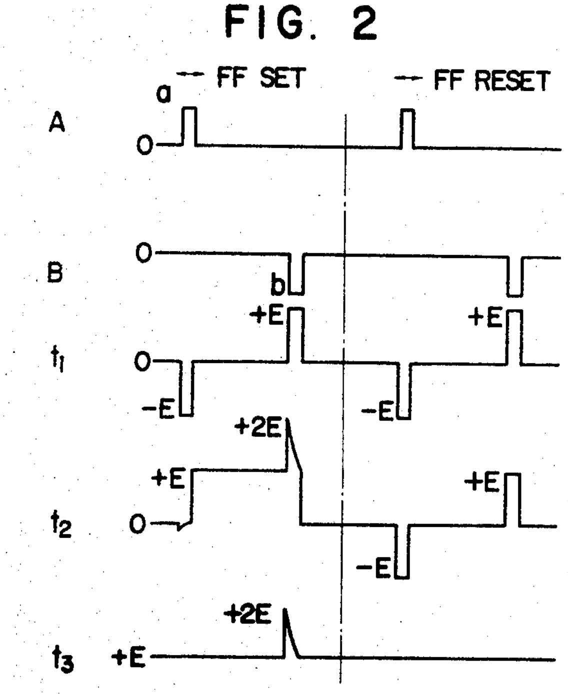
FIG. 2 shows voltage waves at various points in the circuit shown in FIG. 1.

Then when a negative pulse $b$ is impressed upon the read-out pulse input terminal B as shown in the drawing when the flip-flop FF is in its reset state and while the capacitor $C_o$ is charged, the transistor $T_B$ becomes conductive. Conduction of transistor $T_B$ raises the potential of terminal $t_1$ to a value substantially equal to +E, so that the potential of terminal $t_2$ is raised to about 2E. Consequently, the charge of capacitor $C_o$ discharges through terminal $t_2$, second diode D2, resistor $R_o$, and transistor $T_B$, the time constant of discharge being determined by $C_o$—$R_o$. At this time, a pulse of amplitude voltage level of +2E appears at the terminal $t_3$ as shown in FIG. 2 and the charge of the capacitor $C_o$ disappears. This pulse resets flip-flop FF to cause it to return to the set state. In this state, when a positive pulse is again impressed upon the terminal A, the capacitor $C_o$ is charged again. Thus, pulses $a$ and $b$ function as drive pulses to generate write and read-out pulses for condenser $C_o$. As above described, flip-flop FF is reset by the reset pulse after write operation and is set at the time of read-out operation. However, as shown by FIG. 2 which shows the relationship between potentials at various terminals of the basic circuit shown in FIG. 1, under the reset state of flip-flop FF (shown to the right of dot and dash lines in FIG. 2) pulse $a$ will not cause writing but will momentarily drop $t_2$ to a —E potential. Consequently, pulse $b$ will not produce any pulse at terminal $t_3$. In this manner, this circuit can be utilized as a memory circuit or element.

FIG. 2 shows the relation of potentials at various terminals of the basic circuit shown in FIG. 1. In operation the conduction state of the flip-flop is originally established in a set or reset condition to initially establish the logical state of the capacitor. Conventionally, when the flip-flop is set, it is in a binary "0" state, so that when the write pulse occurs the capacitor will be charged also to a binary "0" state. On the other hand, when the flip-flop is in a reset state, its output corresponds to a binary "1," and in this condition the flip-flop will not charge the capacitor when the write pulse occurs. After the initial logical state of the capacitor is established, the pulses $a$ and $b$ cause the flip-flop to periodically recharge the capacitor if said capacitor was in a charged state originally. As shown in FIG. 2, if the initial logical state of the capacitor was a binary "0," corresponding to an initial set state of the flip-flop, then the wave forms on the left side of FIG. 2 will hold true; and, if the initial logical state of the capacitor was a binary "1," corresponding to an initial reset state of the flip-flop, then the wave forms on the right side of FIG. 2 will hold true.

Figure 3:
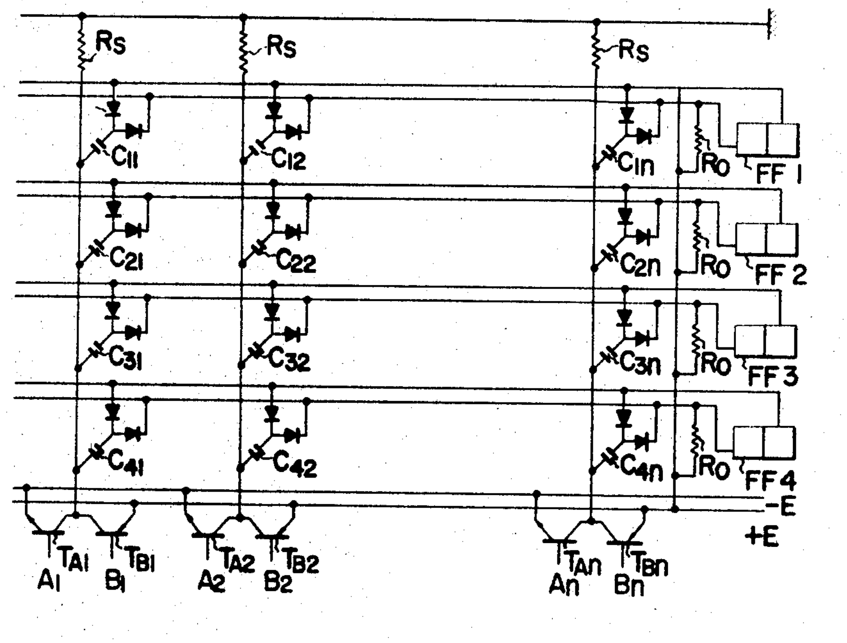
FIG. 3 shows a skeleton diagram of one embodiment of a memory circuit according to this invention.

FIG. 3 illustrates one embodiment of a large capacity memory circuit utilizing a plurality of memory elements each as shown in FIG. 1. This memory circuit has a capacity of four orders or digits each consisting of four bits. A capacitor $C_{1n}$ stores the information of the first bit of the $n$th order, capacitors $C_{2n}$, $C_{3n}$, and $C_{4n}$ respectively store second, third and fourth bits of the $n$th line and so on. These capacitors, each corresponding to the memory capacitor $C_o$ of FIG. 1, are arranged in a matrix. A common flip-flop is provided for each line, thus there is one flip-flop for each bit. As a result, four flip-flops FF1 through FF4 are provided. Pairs of write and read-out transistors $T_{A1}$, $T_{B1}$; $T_{A2}$, $T_{B2}$ . . . $T_{An}$, $T_{Bn}$ are provided for respective columns. A pair of reversely connected diodes is provided for each capacitor in the same manner as in FIG. 1. Other reference characters indicate identical elements as in FIG. 1.

Write and read-out operations of the circuit shown in FIG. 3 are as follows. When it is intended to write the second order, after shifting flip-flops FF1 through FF4 to the nth order, the write pulse is sent to a terminal $A_n$, thus charging capacitors $C_{1n}$ through $C_{4n}$ to the condition corresponding to the set state of said flip-flops. Read-out operation is effected by applying a read-out pulse to a terminal $B_n$ after all flip-flops have been reset.

In order to preserve the memory over a long time, it is necessary to compensate for the decrease in capacitor potential due to leakage resistance. Such compensation can be made by successively reading out first to $n$th orders and by effecting writing operations cyclically. More particularly, respective orders are successively scanned by resetting a flip-flop to read the first order, than to write therein, and then resetting the second flip-flop to read the second order and then write therein. After finishing the scanning operation of the $n$th order, the above mentioned cycle is repeated beginning with the first order. By repeating these cycles it is possible to store information over a long period.

Thus, this invention provides a large capacity memory circuit which has excellent characteristics, is of small size, and is inexpensive because it is fabricated by utilizing a far smaller number of low-price elements than conventional memory devices utilizing memory capacitors. And since these capacitors are fully charged and discharged the accuracy and stability of the memory are extremely high.

FIG. 4 shows in more detail the connection of the circuit shown in FIG. 3. The capacitor memory matrix shown in FIG. 4 comprises a plurality of memory elements each consisting of a memory capacitor and a pair of reversely connected diodes, these memory elements being arranged in a matrix consisting of fifteen columns and twelve lines and having a capacity of 180 bits. A square or rectangular matrix is preferred because this configuration reduces the required number of drive circuits. Further, the number of bits is preferably in a range of from several tens to about one thousand bits when the cost and physical dimensions are considered.

Figure 5:
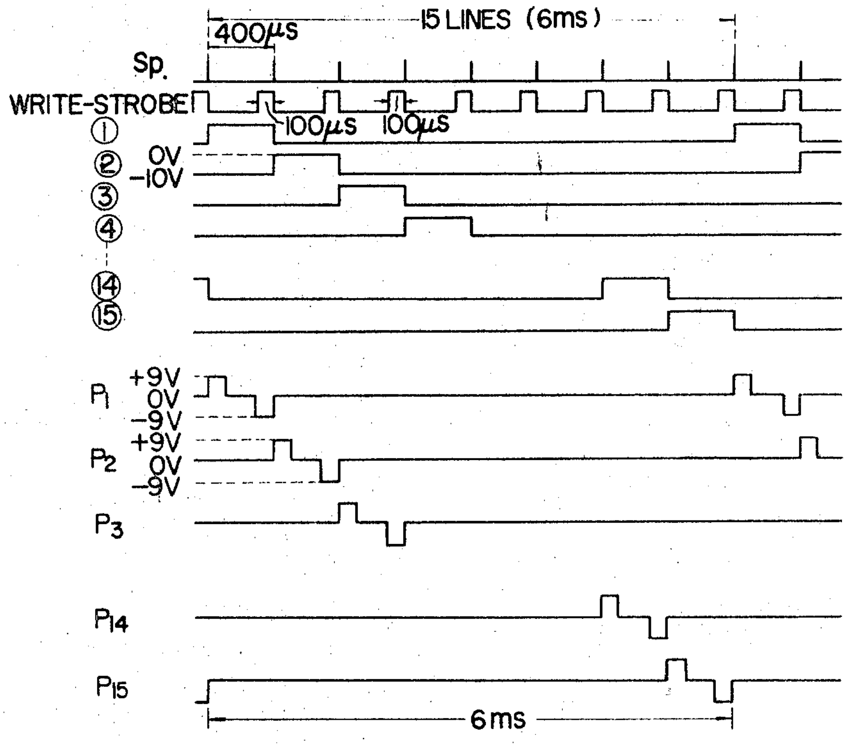
FIGS. 5 and 6 show waveforms at various points in the circuit shown in FIG. 4 as well as various signals.

Each set of read and write amplifiers is connected to each column to the matrix to apply read-out and write pulses to the matrix. The write strobe is a pulse that determines the timing of a write pulse. The write strobe pulse has a waveform as shown in FIG. 5 and is generated by a separate circuit, not shown.

Ring counters CTR1 through CTR15 are provided each having fifteen steps, which number is equal to the number of columns of the memory matrix. The ring counter is constituted by fifteen flip-flops of which only one is in the set condition at one time, and this set condition is shifted successively by the shift pulse. The output of the ring counter is connected to inputs of read and write amplifiers TW1, TR1; TW2, TR2; TW15, TR15, thus specifying columns of the capacitor memory matrix.

Each of the twelve bits of each line of the capacitor memory matrix comprises a read-out line and a write line. These lines are connected to input and output terminals, respectively, of one of twelve read and write registors RWR1, RW2. . . .

The operation of the circuit shown in FIG. 4 is generally as follows.

Figure 6:
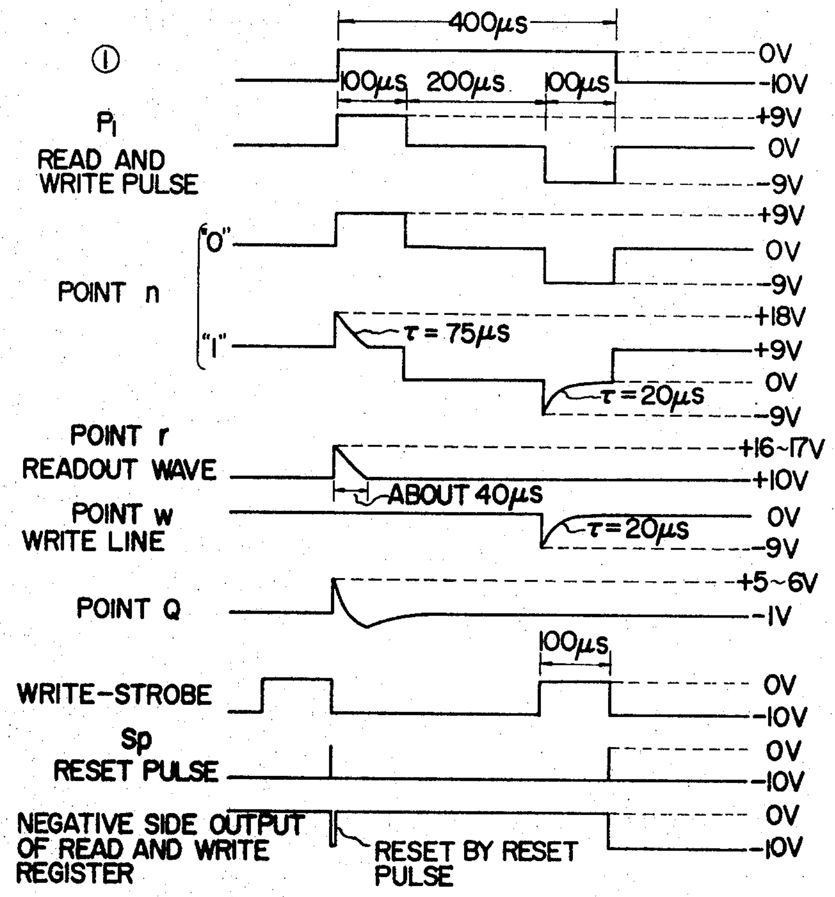

FIGS. 5 and 6 show waveforms at various portions of the circuit. The memory operation is effected in the scheme of bit parallel and digit serial. Then, when the ring counter CTR specifies a particular line of a capacitor memory matrix, all twelve bits in the line are read out and written simultaneously. Upon completion of the scanning of one line, the scanning of the next line is begun until all fifteen lines are successively read out and written.

When the first ring counter CTR1 is in set state, if, among read and write amplifiers associated with the first line, the amplifier TR1 on the read side is rendered conductive for about 100 microseconds to increase the potential of point $P_1$ from normal zero volt to +9 volts, the contents of the memory of twelve bits for the first order will be read out simultaneously. Thus, a read-out wave as shown in FIG. 6 can be obtained only from those bits having "1" stored therein out of twelve read-out lines. Twelve read-out lines are respectively connected to set terminals of twelve flip-flops (read and write registers), as that only those flip-flops supplied with read out wave will reset. However, since those flip-flops not supplied with read-out wave must be reset, a reset pulse is applied thereto at the same time. While this reset pulse is applied concurrently to all twelve flip-flops, the duration thereof is far shorter than that of the read-out wave. Therefore, flip-flops supplied with the read-out wave are set, and those not so supplied are brought to the reset condition. Upon completion of the read-out operation, the point $P_1$ again assumes zero potential for about 200 microseconds. During this period, logical operation or the like is performed, thus changing the contents of the read and write registers. When a definite content is to be stored, no change is effected during this period, and the contents of read and write registers do not change.

The write strobe has a phase relationship as shown in FIG. 5, and when this write strobe coincides with the output from the ring counter, the amplifier TW1 on the write side among read and write amplifiers belonging to the first column becomes conductive for about 100 microseconds, as shown in FIG. 6. Then the point $P_1$ assumes −9 volts to write simultaneously in vertically aligned twelve bits of the first column. Whether "1" or "0" is written in the memory elements of these twelve bits is determined dependent upon whether the corresponding twelve read and write registers are in the set condition or whether they are in the reset condition. If it is assumed now that a certain bit is in the set condition, the output on the negative side would be zero volt to charge the capacitor belonging to said bit to 9 volts thereby to store "1." Under the reset condition, the output on the negative side would be negative (−9 volts, for instance) so that the capacitor would not be charged, thus storing "0." Upon completion of the write operation in such a case, the amplifier TW1 is turned off, and the point $P_1$ again assumes zero volt, whereupon, read-out and write operations of the first column are finished. It takes about 400 microseconds for these operations. Read-out and write operations for the second column are performed in the same manner as in the first column. These operations are successively repeated for the first through 15th columns.

FIGS. 7 and 8 are diagrams indicating read-out and write operations, respectively.

Various problems encountered in the capacitor memory device will now be considered. The first problem is that a long memory period results in the loss of the memory content. Thus, either one of two diodes utilized in the memory element is reversely biased dependent upon whether the capacitor is storing "1" or whether it is storing "0." For example, in the circuit shown in FIG. 4, when the first bit of the first column is storing "1," the potential of the point $n_{11}$ is +9 volts and that of the point $w_1$ is −9 volts, so that the charge stored in the memory capacitor connected to point $n_{11}$ is discharged by the reverse leakage current of the diode $D_1$ connected to the write line. When "1" is stored, the decrease in the voltage across the memory capacitor caused by the leakage current is expressed by $$V=\frac{i\times t}{c}=\frac{1\times 10^{-6}\times 6\times 10^{-3}}{0.01\times 10^{-6}}=0.6v.$$

where:

$i=1$ µa. is the reverse leakage current of the diode $D_1$;
$t=6$ ms. is the memory time; and
$c=0.01$ µf. is the capacitance of the memory capacitor.

Thus, after 6 milliseconds, the terminal voltage V decreases by 0.6 volt. Therefore, it is essential that the diodes utilized in memory elements have very small reverse leakage current. In actual fabrication, these diodes should be carefully insulated.

Read-out waves usually have a magnitude of about 6 volts, but read and write registers are so designed that they can be set even when read-out waves drop to about 4 volts and that they never set when read-out waves drop to less than 1 volt, thus preventing misoperation due to leakage current.

FIG. 9 shows a block diagram of a circuit for performing logical operations by utilizing the time spacing between a read-out pulse and a write pulse in a memory apparatus constructed as shown in FIG. 3. In FIG. 9 reference characters X and Y designate registers, each constructed similarly to the matrix portion of the memory circuit shown in FIG. 3. FFX and FFY designate flip-flops each corresponding to flip-flops FF1 through FF4 of FIG. 3. Flip-flops FFX and FFY are coupled together through an adder and are constructed to be able to store decimal coded signals for one order. Where the logical element is in the form of an adder, one register X stores augends, whereas the other stores addends. Conversely, where the logical element takes the form of a subtractor the register X stores augends, and the register Y stores addends.

In operation, the first column is read-out by applying a read-out pulse and then the addend is added to the augend. The sum thus obtained is then written in the memory. Similarly, the second and following columns are read-out, added, and written up to the $n$th column, thus completing the logical operation. As a result, augends are removed from the register X, and, instead, results of logical operations are stored therein. In order to preserve these results of logical operations over a long time, it is necessary to effect cyclically read-out and write operations starting from the first column to the $n$th column in the same manner as has been described in connection with FIG. 3.

According to this embodiment of this invention a memory device is constructed by utilizing a capacitor which acts as a memory element in such a manner that the presence or absence of charge in the capacitor corresponds to binary logic. Further, flip-flops included in the memory device are utilized to operate as flip-flops for performing logical operations by utilizing the time spacing between the read-out pulse and the write pulse. Accordingly, it is possible not only to fabricate memory devices of large capacity with a smaller number of component elements than conventional memory devices but also to concurrently effect storing and logical operations by commonly utilizing component elements for these operations. Thus, the size of the entire memory and logical device can be greatly reduced, and yet there is provided high performance. Further, because each capacitor acting as the memory element is assigned for one bit and because such a capacitor is completely charged or discharged, stability and accuracy of the device are greatly improved, and the circuit arrangement thereof can be simplified.

While we have illustrated and described certain preferred forms of apparatus embodying our invention, various other arrangements and applications will occur to those skilled in the art. We do not, therefore, desire our invention to be limited to the details of construction and specific arrangements disclosed, and we intend, by the appended claims, to cover all modifications which fall within the spirit and scope of our invention.

What is claimed is:

1. A memory device comprising a capacitor having two terminals, a write transistor and a read-out transistor each connected with one terminal of said capacitor, means for applying a pulse of one polarity to the base electrode of one of said transistors to effect charging of said capacitor, means for applying a pulse of the opposite polarity to the base electrode of the other transistor to effect discharging of said capacitor, a pair of diodes connected in parallel opposition to the other terminal of said capacitor, and a flip-flop having a set terminal connected to said other terminal of said capacitor through one of said diodes and having an output terminal connected to said other terminal of said capacitor through the other of said diodes, whereby pulses created by the discharge of said capacitor set said flip-flop to enable it to recharge said capacitor, thereby improving its function as a memory device by overcoming its loss of charge through leakage.

2. The memory device according to claim 1, including a write-pulse input terminal and a read-out pulse input terminal, and wherein said write transistor is an NPN type transistor, and said read-out transistor is a PNP type transistor, both transistors having respective collector electrodes connected to said one terminal of said capacitor, and having base electrodes respectively connected to said write-pulse input terminal said read-out pulse input terminal.

3. A memory circuit comprising a matrix including a plurality of conductors arranged in lines and columns to form a plurality of intersections; a plurality of pairs of series combinations of first diodes and memory capacitors connected respectively across said plurality of intersections; a plurality of flip-flops, one for each of said lines, each of said flip-flops having set and reset input terminals and an output terminal, said set input terminals being connected respectively to the other sides of said first diodes; a plurality of second diodes connected respectively between the junctions of said plurality of pairs of diodes and capacitors and said respective flip-flop output terminals; and, a plurality of pairs of write and read-out transistors connected respectively to each column conductor, whereby the charges on the respective memory capacitors may be periodically reestablished to overcome their discharge due to leakage.

4. A memory and logic circuit comprising a memory device, said memory device including a capacitor, and a flip-flop connected with said capacitor to respond to write and read-out operations of said memory device; means to utilize said flip-flop as a logical flip-flop during the period between a read-out pulse and a following write pulse for recharging the capacitor at the time of the write pulse, and means to apply said read-out pulse and following write-pulse to said memory device.

5. A memory and logic circuit comprising a pair of registers each including a matrix of memory capacitors, a pair of flip-flops each connected to cooperate with a separate one of said registers, means to utilize said flip-flops as logical flip-flops during the period between a read-out pulse and a following write pulse for recharging the capacitor at the time of the write pulse, and a logic element interconnecting said flip-flops.

6. The memory and logic circuit according to claim 5 wherein said logic element comprises an adder.

7. The memory and logic circuit according to claim 5 wherein said logic element comprises a subtractor.

References Cited

UNITED STATES PATENTS

| | | | |
|---|---|---|---|
| 3,014,169 | 12/1961 | MacIntyre | 320—1 |
| 3,025,411 | 3/1962 | Rumble | 340—173X |
| 3,142,824 | 7/1964 | Hill | 340—173 |
| 3,187,260 | 6/1965 | Dove | 307—246X |
| 3,292,159 | 12/1966 | Koerner | 340—172.5 |
| 3,334,336 | 8/1967 | Koerner et al. | 340—173 |
| 3,337,862 | 8/1967 | Croft et al. | 307—255 |

PAUL J. HENON, Primary Examiner

H. E. SPRINGBORN, Assistant Examiner

U.S. Cl. X.R.

340—173